(12) United States Patent
Soliman et al.

(10) Patent No.: US 10,999,330 B2
(45) Date of Patent: May 4, 2021

(54) MANAGEMENT OF VOICE SERVICES FOR USER EQUIPMENTS IN COVERAGE ENHANCEMENT (CE) MODE B

(71) Applicant: Apple Inc., Cupertino, CA (US)

(72) Inventors: Ahmed Soliman, Nuremberg (DE); Amr Abdelrahman Yousef Abdelrahman Mostafa, Munich (DE); Jerome Parron, Fuerth (DE); Puneet Jain, Hillsboro, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/349,587

(22) PCT Filed: Jan. 31, 2018

(86) PCT No.: PCT/US2018/016285
§ 371 (c)(1),
(2) Date: May 13, 2019

(87) PCT Pub. No.: WO2018/148083
PCT Pub. Date: Aug. 16, 2018

(65) Prior Publication Data
US 2019/0273762 A1    Sep. 5, 2019

Related U.S. Application Data

(60) Provisional application No. 62/457,598, filed on Feb. 10, 2017.

(51) Int. Cl.
*H04L 29/06* (2006.01)
*H04W 48/06* (2009.01)
(Continued)

(52) U.S. Cl.
CPC ...... *H04L 65/1006* (2013.01); *H04L 65/1016* (2013.01); *H04L 65/1073* (2013.01);
(Continued)

(58) Field of Classification Search
CPC . H04L 65/80; H04L 65/1006; H04L 65/1016; H04L 65/1073; H04L 65/1083;
(Continued)

(56) References Cited

U.S. PATENT DOCUMENTS

| 2008/0293428 A1* | 11/2008 | Rey | H04L 47/70 455/452.2 |
| 2009/0257418 A1* | 10/2009 | Allen | H04M 7/123 370/338 |

(Continued)

OTHER PUBLICATIONS

International Patent Office—International Search Report and Written Opinion dated Apr. 16, 2018 from International Application No. PCT/US2018/016285, 18 pages.

(Continued)

*Primary Examiner* — Kostas J Katsikis
(74) *Attorney, Agent, or Firm* — Fish & Richardson P.C.

(57) ABSTRACT

Embodiments of the present disclosure describe methods, apparatuses, and systems for management of voice services for user equipments (UEs) in coverage enhancement (CE) mode B. A cellular protocol stack (CPS) of the UE may indicate to an internet protocol (IP) multimedia services (IMS) circuitry of the UE that the UE is operating in the CE mode B (or will be operating in the CE mode B when it awakes from idle mode). The IMS circuitry may receive an SIP invite from an IMS server to invite the UE to engage in a mobile terminated (MT) call. In response to the SIP invite, the IMS circuitry of the UE may reject the SIP invite and deregister the UE from voice services. Other embodiments may be described and claimed.

27 Claims, 11 Drawing Sheets

(51) Int. Cl.
*H04W 76/18* (2018.01)
*H04W 60/06* (2009.01)
*H04W 16/24* (2009.01)
*H04W 4/70* (2018.01)

(52) U.S. Cl.
CPC .......... *H04L 65/1083* (2013.01); *H04L 65/80* (2013.01); *H04W 16/24* (2013.01); *H04W 48/06* (2013.01); *H04W 60/06* (2013.01); *H04W 76/18* (2018.02); *H04Q 2213/13274* (2013.01); *H04W 4/70* (2018.02)

(58) Field of Classification Search
CPC ..... H04L 12/1827; H04L 41/50; H04L 43/08; H04L 47/24; H04L 47/74; H04L 47/76; H04L 47/805; H04L 61/00; H04L 67/04; H04L 67/18; H04L 67/322; H04L 67/2828; H04W 16/24; H04W 76/18; H04W 4/70; H04W 60/06; H04W 48/06; H04Q 2213/13274; H04N 21/2402; H04N 21/44209
See application file for complete search history.

(56) References Cited

U.S. PATENT DOCUMENTS

| | | | | |
|---|---|---|---|---|
| 2012/0044867 | A1* | 2/2012 | Faccin | H04W 60/06 370/328 |
| 2016/0242234 | A1* | 8/2016 | Takeda | H04L 65/1016 |
| 2017/0006514 | A1* | 1/2017 | Kiss | H04L 45/745 |
| 2017/0265187 | A1* | 9/2017 | Chen | H04B 7/15528 |
| 2017/0289883 | A1* | 10/2017 | Kiss | H04W 12/06 |
| 2017/0346858 | A1* | 11/2017 | Vashi | H04W 76/19 |
| 2017/0359852 | A1* | 12/2017 | Wu | H04W 76/25 |
| 2018/0092085 | A1* | 3/2018 | Shaheen | H04W 36/14 |
| 2019/0110241 | A1* | 4/2019 | Jain | H04W 4/70 |
| 2019/0150218 | A1* | 5/2019 | Futaki | H04W 76/27 370/329 |
| 2019/0273762 | A1* | 9/2019 | Soliman | H04L 65/1073 |
| 2020/0100088 | A1* | 3/2020 | Kim | H04W 8/005 |

OTHER PUBLICATIONS

Ericsson, "Authorization of use of Coverage Enhancements," 3GPP TSG-RAN2 Meeting #95bis, R2-166564, Agenda Item: 8.11.4 Other, Oct. 10-14, 2016, Kaohsiung, Taiwan, 6 pages.

3GPP, "Technical Specification Group Services and System Aspects; Study on extended architecture support for Cellular Internet of Things (CIoT) (Release 14)," 3GPP TR 23.730 V14.0.0 (Dec. 2016), Lte Advanced Pro, 83 pages.

3GPP, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.1.0 (Dec. 2016), Lte Advanced Pro, 317 pages.

* cited by examiner

MANAGEMENT OF VOICE SERVICES FOR USER EQUIPMENTS IN COVERAGE ENHANCEMENT (CE) MODE B

RELATED APPLICATION

This application is a national phase entry under 35 U.S.C. § 371 of International Application No. PCT/US2018/016285, filed Jan. 31, 2018, entitled "MANAGEMENT OF VOICE SERVICES FOR USER EQUIPMENTS IN COVERAGE ENHANCEMENT (CE) MODE B," which claims priority to U.S. Provisional Application No. 62/457,598, filed Feb. 10, 2017, the entire disclosures of which are hereby incorporated by reference.

FIELD

Embodiments of the present disclosure generally relate to the field of wireless communication networks, and more particularly, to apparatuses, systems, and methods associated with management of voice services for user equipments (UEs) in coverage enhancement (CE) mode B.

BACKGROUND

A user equipment (UE) may be able to operate in a variety of coverage modes, such as a normal coverage mode, a coverage enhancement (CE) mode A, and/or a CE mode B. The UE may determine whether to operate in normal coverage or CE, e.g., based on radio conditions on the wireless communication network. In idle mode, the UE doesn't inform the network about which coverage mode it is operating in. While operating in CE, when the UE wants to establish a connection with an access node (e.g., evolved Node B (eNB) or next generation base station (gNB)) of the wireless communication network, the access node configures the UE for either CE mode A or CE mode B. For example, the UE may operate in CE mode A in poor radio conditions, and may operate in CE mode B in even poorer radio conditions.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

For the purposes of the present disclosure, the phrases "A or B," "A and/or B," and "A/B" mean (A), (B), or (A and B).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array ("FPGA") an application specific integrated circuit ("ASIC"), etc.), discrete circuits, combinational logic circuits, system on a chip, SOC, system in a package, SiP, that provides the described functionality. In some embodiments, the circuitry may execute one or more software or firmware modules to provide the described functions. In some embodiments, circuitry may include logic, at least partially operable in hardware.

Figure 1:
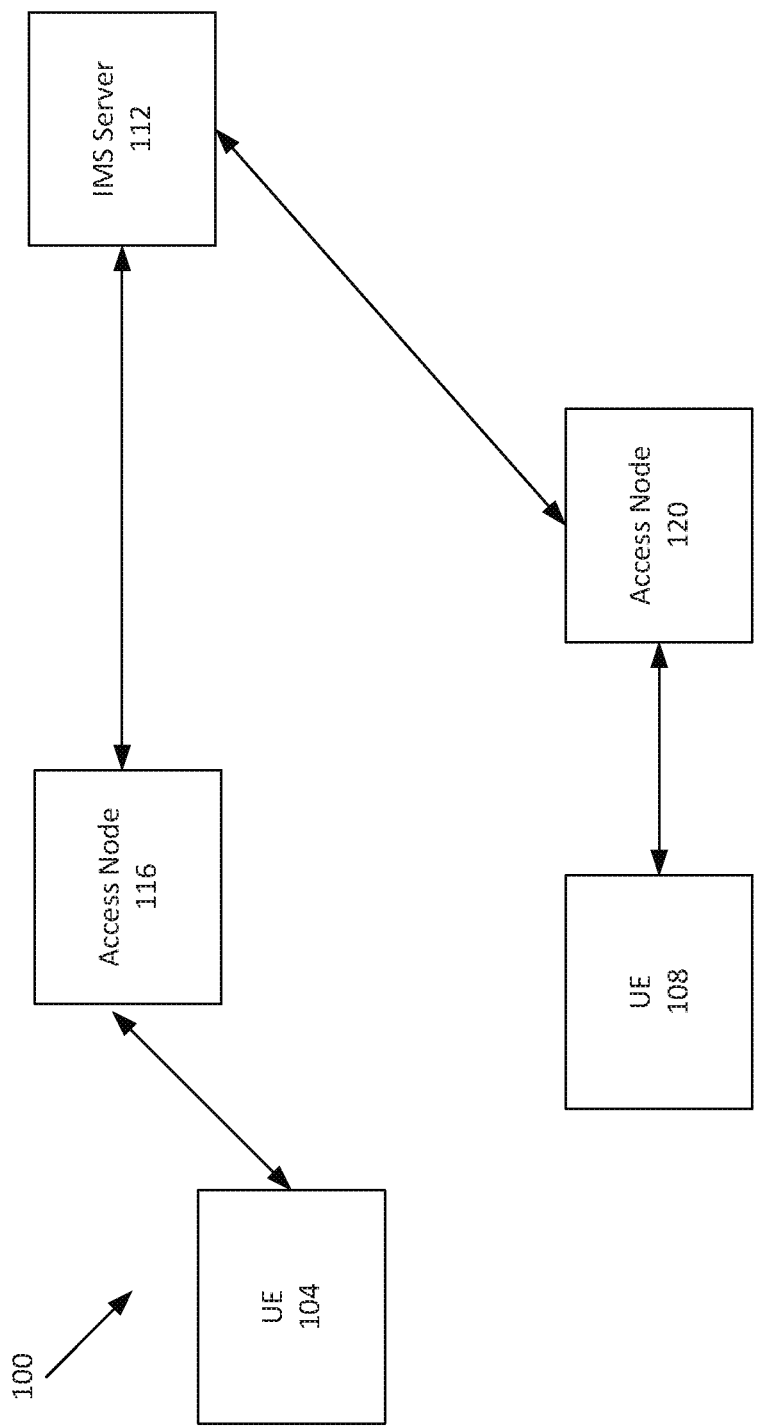
FIG. 1 schematically illustrates a network environment in accordance with some embodiments.

FIG. 1 illustrates a network environment 100 in accordance with various embodiments. Network environment 100 may include a plurality of user equipments (UEs), including UE 104 and UE 108. Network environment 100 may further include an internet protocol (IP) multimedia services (IMS) server 112. The IMS server 200 may facilitate IMS voice and/or video calls between two (or more) UEs, such as between the UE 104 and the UE 108. From one UE's perspective, the IMS calls may be either mobile originated (MO) or mobile terminated (MT). MO calls are initiated by that UE, while MT calls are initiated by another UE. The IMS server 112 may receive a request (also referred to as an MT call trigger) from the originating UE that initiates the IMS call. The request may identify the terminating UE with which the originating UE wishes to connect. The IMS server 200 may send a session initiation protocol (SIP) invite to the terminating UE to invite the terminating UE to form an IMS call with the originating UE.

In various embodiments, communications between the IMS server 112 and the UE 104 or UE 108 may be routed between respective access nodes 116 or 120 of a radio access network ("RAN"). In some embodiments, the communications between the IMS server 112 and the UE 104 or UE 108 may be further routed between one or more additional devices (not shown), such as a mobility management entity (MME), packet data network gateway (P-GW) and/or serving gateway (S-GW). The access nodes 116 and/or 120 may be referred to as a base station ("BS"), NodeB, evolved NodeB ("eNB"), next Generation NodeB ("gNB"), RAN node, Road Side Unit ("RSU"), and so forth, and can comprise a ground station (e.g., a terrestrial access point) or a satellite station providing coverage within a geographic area (e.g., a cell). An RSU may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU."

In some embodiments, the RAN may be a next generation ("NG") radio access network ("RAN"), in which case the access node 116 and/or access node 120 may be a gNB that communicates with the respective UE 104 or 108 using a new radio ("NR") access technology.

The UE 104 and/or UE 108 may be any mobile or non-mobile computing device that is connectable to one or more cellular networks. For example, the UE 104 and/or 108 may be a smartphone, a laptop computer, a desktop computer, a vehicular computer, a smart sensor, etc. In some embodiments, the UE 104 and/or 108 may be an Internet of Things ("IoT") UE, which may include a network access layer designed for low-power IoT applications utilizing short-lived UE connections. An IoT UE can utilize technologies such as machine-to-machine ("M2M") or machine-type communications ("MTC") for exchanging data with an MTC server or device via a public land mobile network ("PLMN"), Proximity-Based Service ("ProSe") or device-to-device ("D2D") communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (for example, keep-alive messages, status updates, etc.) to facilitate the connections of the IoT network.

Figure 2:
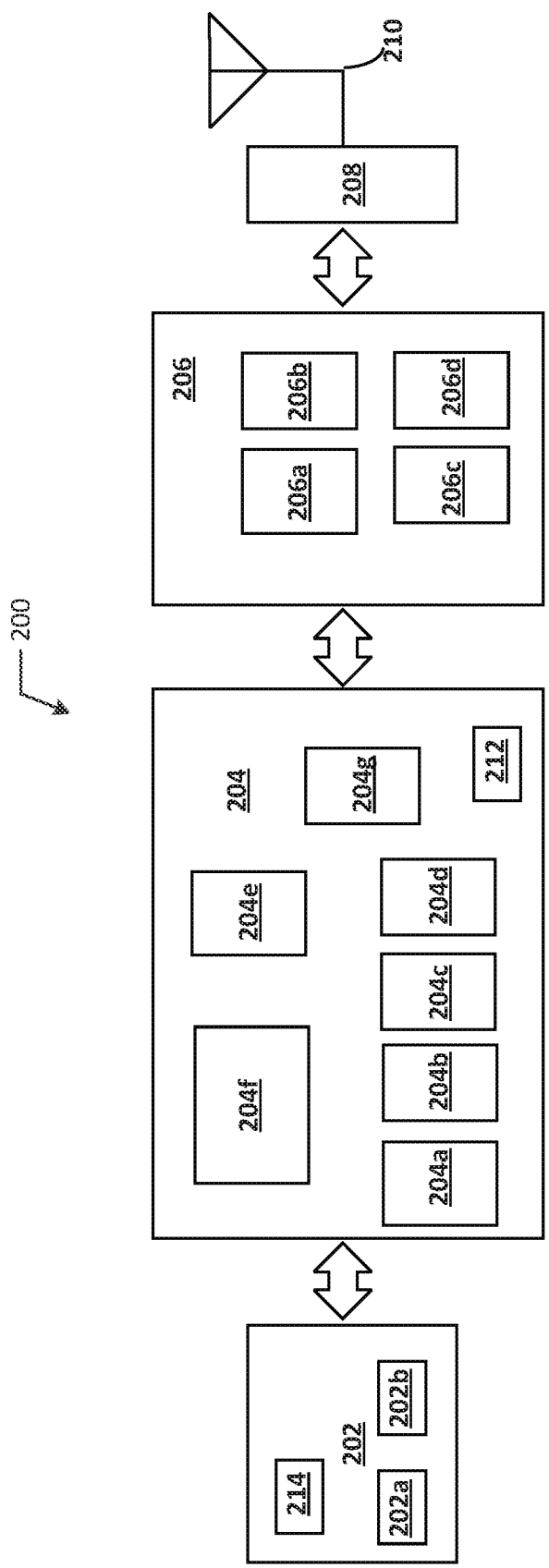
FIG. 2 schematically illustrates an electronic device in accordance with some embodiments.

FIG. 2 schematically illustrates an electronic device 200 that may correspond to a UE (e.g., the UE 104 and/or UE 108) or another device described herein (e.g., IMS server 112, access node 116, and/or access node 120) in accordance with various embodiments. As shown, the electronic device 200 may include application circuitry 202, baseband circuitry 204, radio frequency circuitry 206, front-end module (FEM) circuitry 208, and one or more antennas 210, coupled together at least as shown. In embodiments in which the electronic device 200 corresponds to a UE (e.g., UE 104 and/or UE 108), the UE may include a cellular protocol stack (CPS) 212 and an IMS circuitry 214 coupled to one another. In some embodiments, the CPS 212 may be at least partially implemented in the baseband circuitry 204, such as by CPU 804e and/or one or more of baseband processors 204a-d. In some embodiments, the IMS circuitry 214 may be at least partially implemented in the application circuitry 202, such as by processor(s) 802a and/or computer-readable media 802b. These and other components of the electronic device 200 will be described in further detail below.

Figure 3:
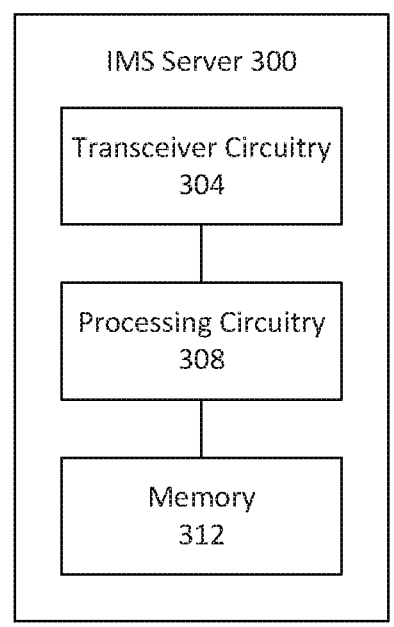
FIG. 3 schematically illustrates an internet protocol (IP) multimedia services (IMS) server in accordance with some embodiments.

FIG. 3 schematically illustrates an IMS server 300 in accordance with various embodiments. The IMS server 300 may correspond to the IMS server 112. In various embodiments, the IMS server 300 may include transceiver circuitry 304, processing circuitry 308, and/or a memory 312 coupled to one another as shown. In some embodiments, the memory 312 may store instructions that are executable by the processing circuitry 308 to perform various operations as described herein.

Various embodiments may be described herein from the perspective of the UE 104 receiving an MT call from the UE 108 and/or initiating an MO call to the UE 108. However, it will be apparent that the description may also be applied to the perspective of the UE 108 initiating an MO call to the UE 104 and/or receiving an MT call from the UE 104

In various embodiments, the UE 104 may be able to operate in a variety of coverage modes, such as a normal coverage mode, a coverage enhancement (CE) mode A, and/or a CE mode B. The UE 104 (e.g., the CPS 212 of the UE 100) may determine which coverage mode to operate in based on radio conditions on the wireless communication network. For example, if radio conditions are below a first quality level, the UE 104 may operate in the CE mode B. If radio conditions are above the first quality level but below a second quality level then the UE 104 may operate in the CE mode A. If radio conditions are above the second quality level, then the UE 104 operate in the normal coverage mode.

In various embodiments, communications between the UE 104 and the access node 116 may be repeated when the UE 104 is in the CE mode A and/or CE mode B. For example, the access node 116 may repeat transmissions to the UE 104, such as a physical downlink control channel (PDCCH) and/or physical downlink shared channel (PDSCH). Additionally, or alternatively, UE 104 may repeat transmissions to the access node 116 (such as a physical uplink control channel (PUCCH) and/or physical uplink shared channel (PUSCH)) A greater number of repetitions of the communications may be used when the UE 104 is in the CE mode B than when the UE is in the CE mode A, thereby enabling coverage in lower quality conditions. The non-access stratum (NAS) timers in the UE 104 and MME may be extended to cover the expected delay for signaling and thereby avoid NAS message retransmission increase and higher signaling load. Furthermore, in some embodiments, one or more additional functions may be disabled when the UE 104 is in the CE mode B rather than the CE mode A, or in the CE mode A rather than the normal coverage mode.

In various embodiments, one or more protocol layers of the CPS 212 of the UE 104 may determine the radio conditions based on one or more signal measurements. For example, in some embodiments, the radio conditions may correspond to one or more of a channel quality indicator (CQI), a received signal received power (RSRP), a received signal received quality (RSRQ), a received signal strength indicator (RSSI), a signal-to-noise ratio (SNR), or a signal-to-noise-plus-interference ratio (SINR). The quality level that determines which mode the coverage mode the UE 104 will operate in may correspond to one or more thresholds associated with the radio conditions.

When the UE 104 is in the CE mode B, the UE 104 should not participate in IMS voice or video calls. Accordingly, in accordance with various embodiments described herein, the UE 104 may deregister from voice and/or video services with the wireless communication network responsive to an invitation (e.g., SIP invite) from the IMS server 112 for a MT call when the UE 104 is in the CE mode B.

For example, the CPS 212 of the UE 104 (e.g., the radio resource control (RRC) layer of the CPS 212) may determine that radio conditions on the wireless communication network (e.g., on the serving cell) are below the first quality level, and may send an indication to the IMS circuitry 214 to indicate that the radio conditions are below the first quality level. The indication may also indicate that the UE 100 is to transition to the CE mode B. In some embodiments, the CPS 104 may transition the UE 100 to the CE mode B in response to the determination. In other embodiments, the CPS 104 may be in a radio resource control (RRC) connection state (e.g., RRC-Idle state) that does not involve being in a specific coverage mode. However, the CPS 104 may transition the UE 100 to the CE mode B when the UE 100 transitions to a different RRC connection state that does require being in a specific coverage mode, such as RRC-Connected.

In various embodiments, the IMS circuitry 214 of the UE 104 may receive an SIP invite from the IMS server 112. The SIP invite may request initiation of a MT IMS voice or video call, such as voice over Long Term Evolution (voLTE). In some embodiments, the CPS 212 may transition the UE 104 to the RRC-Connected mode as part of receiving the SIP invite, and thus the CPS 212 may transition the UE 104 to the CE mode B. The IMS circuitry 214 may reject the SIP invite and deregister from voice and/or video services on the wireless communication network in response to the SIP invite and based on the indication that the radio conditions are below the first quality level (and/or based on the UE 104 being in the CE mode B).

The IMS circuitry 214 may deregister from voice and/or video services, for example, by transmitting an SIP register message to the IMS server 112. The SIP register message may be similar to the SIP register message that is transmitted by the UE 104 to initially register for voice and/or video services, but with a field having a different value to indicate that the UE 104 is requesting deregistration from the voice and/or video services. In some such embodiments, the IMS circuitry 214 may also transmit another message (e.g., a 480 temporary unavailable message) to the IMS server 112 to reject the SIP invite. Alternatively, a new message may be transmitted by the IMS circuitry 214 to the IMS server 112 to deregister the UE 104 from voice and/or video services. For example, the IMS circuitry 214 may transmit a single message to the IMS server 112 to both reject the SIP invite and deregister the UE 104 from voice and/or video services. The new message may additionally or alternatively omit one or more fields that are included in the SIP register message but not necessary for the purpose of deregistration.

In various embodiments, the IMS server 112 may process the deregistration of the UE 104 from the voice or video services, and may mark the UE 104 as temporarily unavailable. For example, referring to IMS server 300 of FIG. 3, the processor circuitry 308 of the IMS server 300 may receive (e.g., via the transceiver circuitry 304) a message from the UE 104 to request the deregistration, and may store a status indicator in the memory 312 to indicate that the UE 104 is temporarily unavailable. The processing circuitry 308 of the IMS server 300 may reject any further requests for an IMS voice or video call with the UE 104 received by the IMS server 200 (e.g., from the UE 108) while the UE 104 is marked as temporarily unavailable. Accordingly, the IMS server 300 may not send an SIP invite to the UE 104 or configure dedicated evolved packet system (EPS) bearers for the UE 104 while the UE 104 is in the CE mode B, thereby conserving signaling and resources.

As discussed above, the UE 104 may not deregister from voice and/or video services responsive to the indication that the radio conditions are below the first quality level, but may instead only deregister from voice and/or video services after also receiving an SIP invite. This prevents unnecessary signaling when the UE 104 transitions to CE mode B.

In various embodiments, the UE 104 (e.g., the CPS 212) may determine that signal conditions on the wireless communication network are sufficient (e.g., above a signal quality level) for voice and/or video calls. The CPS 212 may send an indication to the IMS circuitry 214 of the UE 104 to indicate that the signal conditions are sufficient for voice and/or video calls. The IMS circuitry 214 may re-register for voice and/or video services in response to the indication. For example, the IMS circuitry 214 may send an SIP register message to the IMS server 112. After re-registration, the UE 104 may again be available for MT IMS calls.

In some embodiments, the signal conditions sufficient for the UE 104 to again engage in voice and/or video calls may correspond to signal conditions that are suitable for the UE 104 to transition from the CE mode B to the CE mode A. However, when the UE 104 is in idle mode, the UE 104 may not know if it operates in CE mode A or CE mode B until it enters the RRC connected mode with the access node 116. Accordingly, the signal quality level used by the UE 104 to determine whether to re-register for voice services may be the same or different than the parameters used by the access node 116 to determine whether the UE 104 is to operate in the CE mode A or CE mode B.

In various embodiments, a user of the UE 104 may initiate an MO call while the UE 104 is in the CE mode B. For example, the IMS circuitry 214 may receive an MO call request initiated by the user. The IMS circuitry 214 may reject the MO call request. Accordingly, the UE 104 may not transmit a request to the IMS server 112 to initiate an MO IMS call when the UE 104 is in the CE mode B.

In some embodiments, the UE 104 may display an indicator on a display of the UE 104 when the UE 104 is in the CE mode B. The indicator may indicate (e.g., to the user) that voice and/or video services are unavailable on the UE 104.

In some embodiments, the UE 104 may be configured as a "data centric" UE or a "voice centric" UE. The UE 104 may be permitted to operate in the CE mode B when the UE is configured as a data centric UE, but may not be permitted to operate in the CE mode B when the UE is configured as voice centric. Accordingly, the UE 104 may perform the operations described herein related to operation in the CE mode B (e.g., determination that the signal conditions are below the signal quality level and deregistration from voice and/or video services) when the UE 104 is configured as a data centric UE, but not when the UE 104 is configured as a voice centric UE. In some embodiments, the configuration of the UE 104 as data centric or voice centric may be selected/changed by the user. Additionally, or alternatively, the configuration may be set by another entity, such as the device manufacturer or the network operator, for example, based on the type of device that the UE 104 is. In some such embodiments, the user may not be permitted to change the configuration.

In some embodiments, similar features may be used by the UE 104 to deregister from one or more services when the UE 104 is operating in the CE mode A. For example, the UE 104 may deregister from video services (but not voice services) when the UE 104 is in the CE mode A. In some embodiments, the UE 104 may deregister from the video services responsive to receiving an SIP invite for a video call. The UE 104 may deregister from both video and voice services when the UE 104 is in the CE mode B, as discussed herein.

Figure 4:
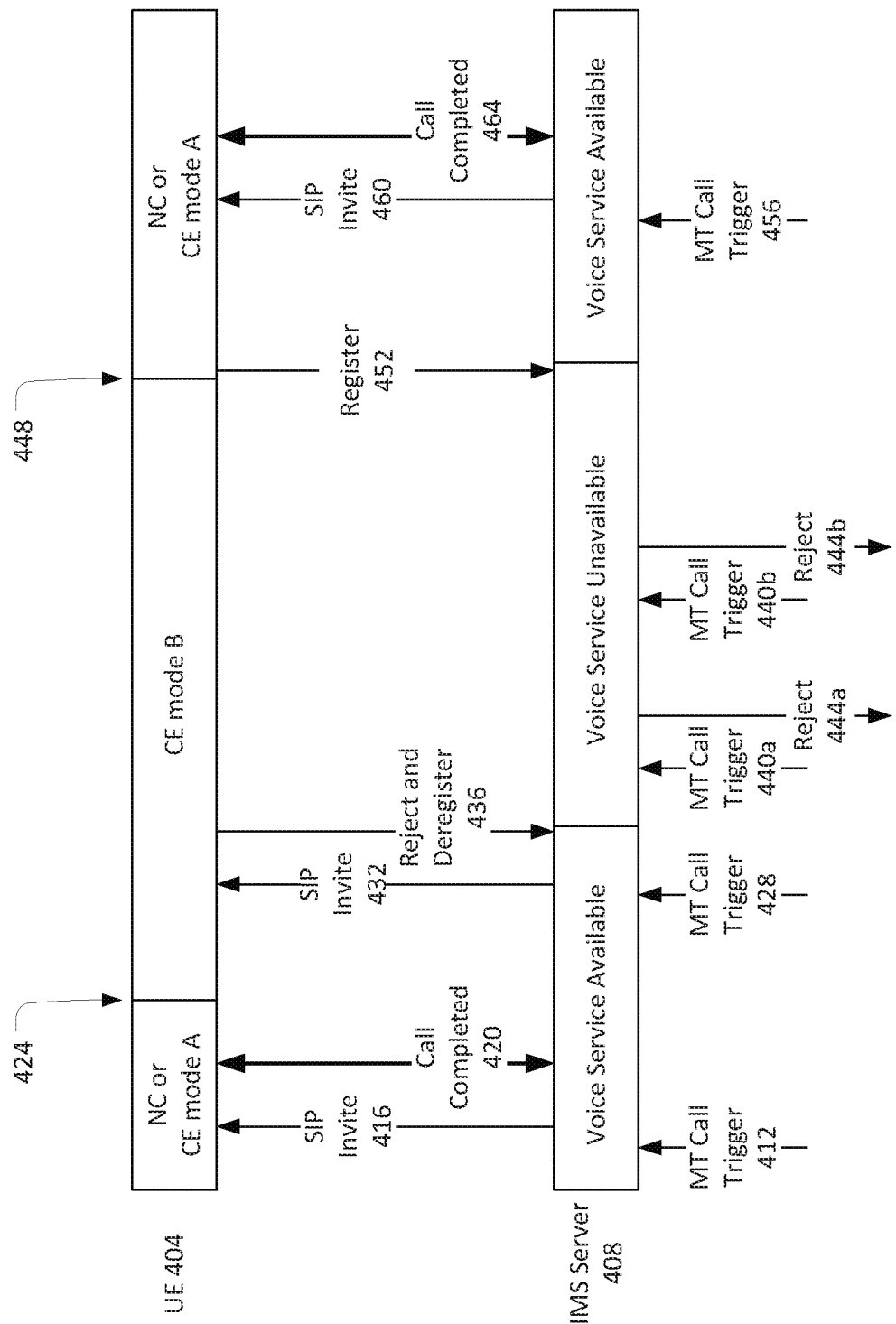
FIG. 4 graphically illustrates signaling that may be performed by a UE and an IMS server over time, in accordance with some embodiments.

FIG. 4 graphically illustrates signaling that may be performed by a UE 404 (e.g., UE 104) and an IMS server 408 (e.g., IMS server 112) over time, in accordance with some embodiments. The UE 404 may initially be in the normal coverage (NC) or CE mode A. Accordingly, the IMS server 408 may have the UE 404 marked as available for voice services. The IMS server 408 may receive an MT call trigger 412 (e.g., from another UE, such as the UE 108) to request an IMS call with the UE 404. The IMS server 408 may send an SIP invite 416 to the UE 404, and configure dedicated EPS bearers for the UE 404. The voice call may be completed at 420.

At time point 424, the UE 404 may transition to the CE mode B. However, the UE 404 may not inform the IMS server 408 of the transition at that time. Thereafter, the IMS server 408 may receive another MT call trigger 428 and send another SIP invite 432 to the UE 404. At 436, the UE 404 may reject the SIP invite 432 and deregister from voice services responsive to receiving the SIP invite 432 and based on the UE 404 being in the CE mode B. The IMS server 408 may mark the UE 404 as temporarily unavailable for voice services.

The IMS server 408 may receive one or more further MT call triggers 440*a-c*. However, the IMS server 408 may reject the further MT call triggers 440*a-c* (e.g., by sending respective rejection messages 444*a-c* to the requesting UE). Accordingly, the IMS server 408 may not send an SIP invite to the UE 404 and/or configure dedicated EPS bearers for the UE 404 while the UE 404 is marked as temporarily unavailable.

At time point 448, the UE 404 may transition to the CE mode A or normal coverage mode. The UE 404 may send a message 452 (e.g., SIP register message) to the IMS server 408 to re-register for voice services responsive to the transition to the CE mode A or normal coverage mode. The IMS server 408 may mark the UE 404 as available for voice services (or remove/delete the prior indication that the UE 404 was unavailable for voice services).

The IMS server 408 may thereafter receive another MT call trigger 456 to request an IMS call with the UE 404. The IMS server 408 may send an SIP invite 460 to the UE 404 and the call may be completed at 464.

Figure 5:
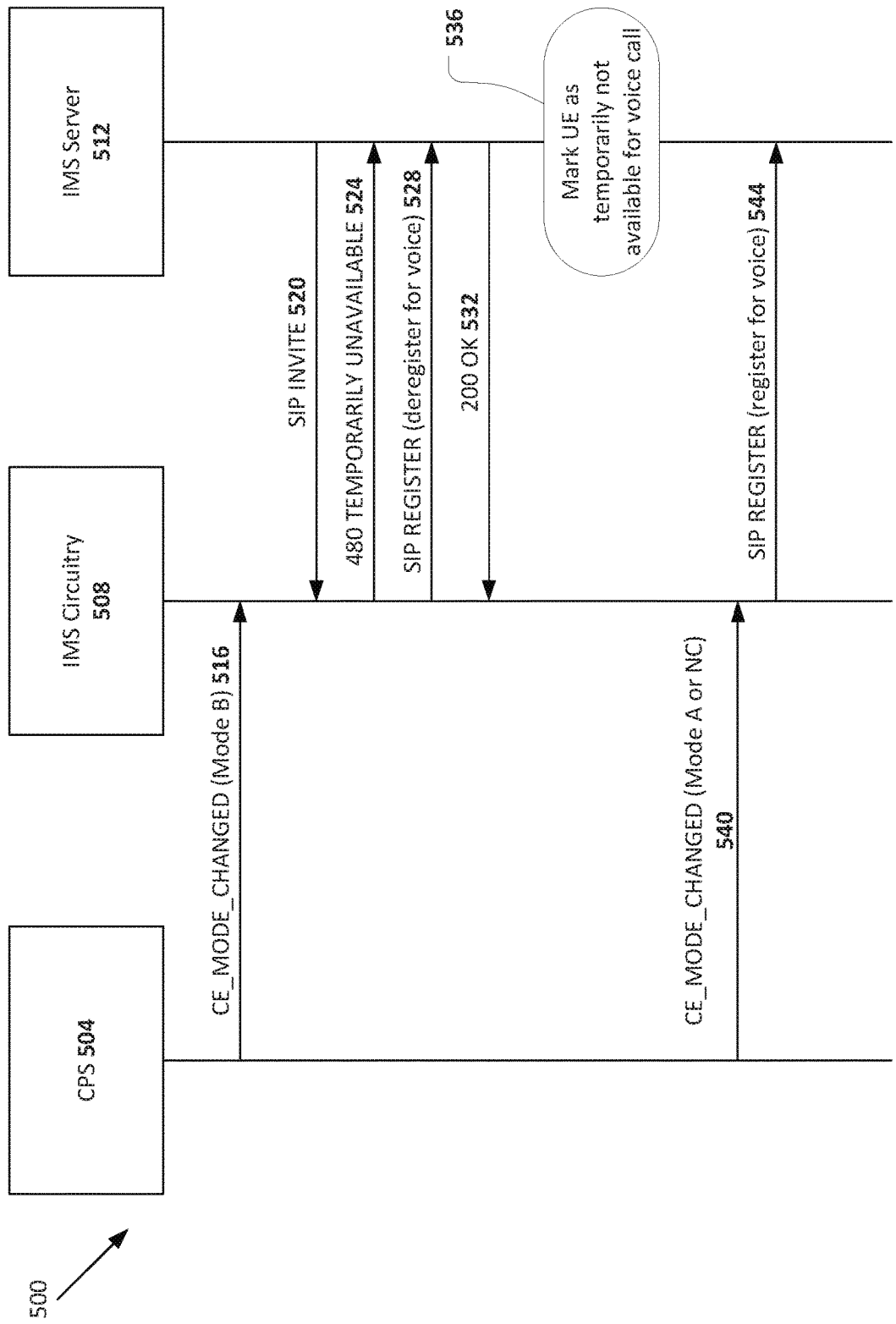
FIG. 5 is a flowchart of a process for managing voice services when the UE is in the CE mode B, according to some embodiments.

FIG. 5 illustrates a signal flowchart of a process 500, and depicts various signals that may be communicated between a CPS 504, an IMS circuitry 508, and an IMS server 512 during the process 500. The CPS 504 and IMS circuitry 508 may be included in a UE (e.g., UE 104), and may correspond to the CPS 212 and IMS circuitry 214 of FIG. 2. The IMS server 512 may correspond to the IMS server 112 of FIG. 1 and/or IMS server 300 of FIG. 3. The process 500 depicted in FIG. 5 may use the existing SIP register message to deregister the UE from voice services in response to receiving an SIP invite when the UE is in the CE mode B.

The CPS 504 may send an indication 516 to the IMS circuitry 508 to indicate that the UE has transitioned or will transition to the CE mode B. Thereafter, the IMS server 512 may send an SIP invite 520 to the IMS circuitry 508 of the UE. The SIP 520 may be an invitation for the UE to engage in an MT voice call. The IMS circuitry 508 may send a message 524 to the IMS server 512 to reject the MT voice call in response to the SIP invite 520. In some embodiments, the message 524 may be a 480 TEMPORARILY UNAVAILABLE message. The IMS circuitry 508 may also send an SIP REGISTER message 528 to deregister the UE from voice services. In some embodiments, the SIP REGISTER message 528 may also deregister the UE from video services.

The IMS server 512 may send a confirmation message 532 (e.g., 200 OK) to the IMS circuitry 508 to acknowledge the deregistration of the UE from voice services. At 536, the IMS server 512 may mark the UE as temporarily not available for voice calls.

The CPS 504 may thereafter send a message 540 to the IMS circuitry 508 to indicate that the UE has transitioned or will transition to the CE mode A or normal coverage mode. The CPS 504 may send the message 540, for example, if radio conditions on the wireless communication network have improved above a signal quality level. The IMS circuitry 508 may send an SIP register message 544 to the IMS server 512 responsive to the message 540. The SIP register message 544 may re-register the UE for voice services. The IMS server 512 may delete and/or modify the stored mark that the UE was not available for voice calls. Accordingly, the UE may again be available to receive MT voice calls via the IMS server 512.

Figure 6:
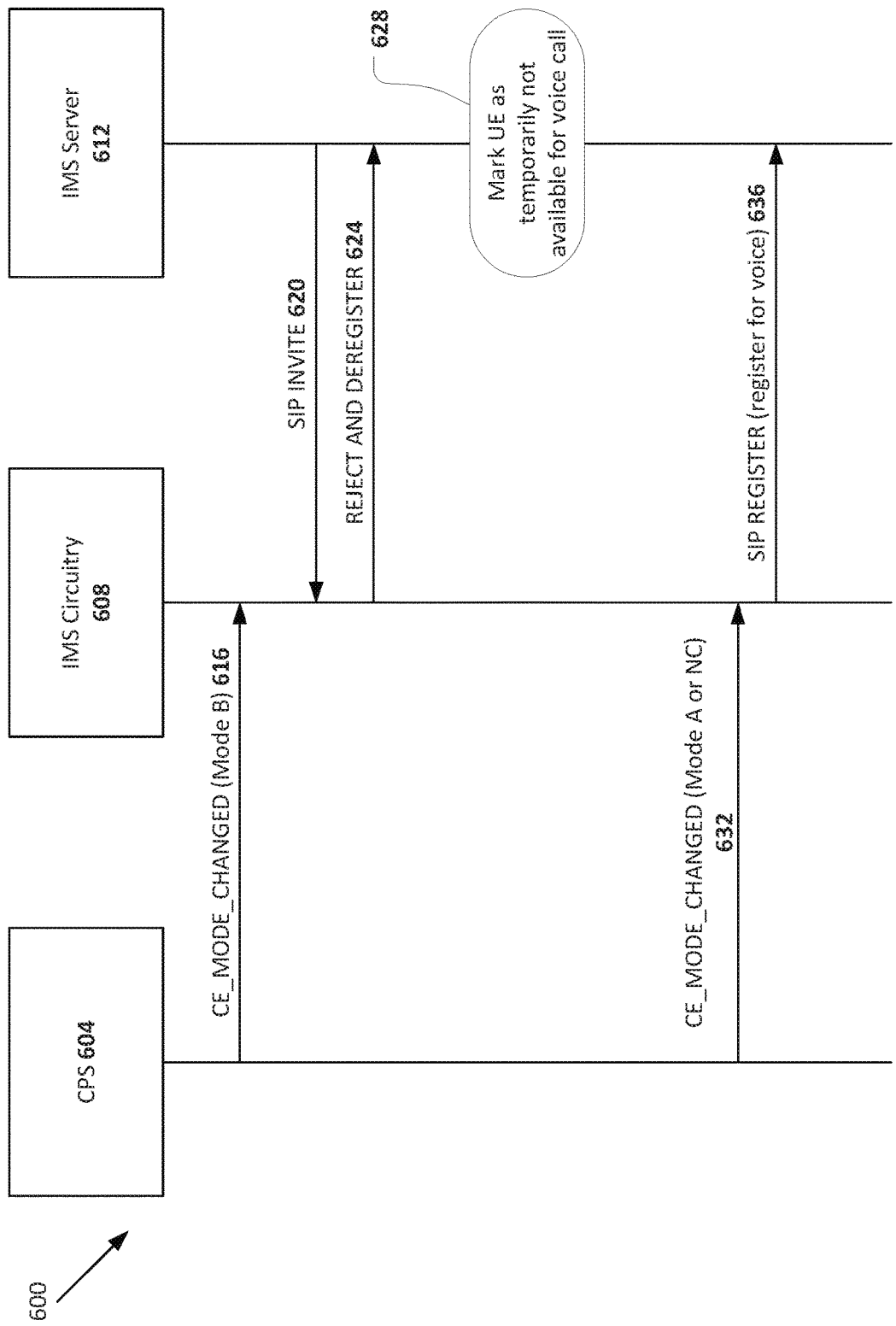
FIG. 6 is another flowchart of a process for managing voice services when the UE is in the CE mode A, according to some embodiments.

FIG. 6 illustrates a signal flowchart of a process 600, and depicts various signals that may be communicated between a CPS 604, an IMS circuitry 608, and an IMS server 612 during the process 600. The CPS 604 and IMS circuitry 608 may be included in a UE (e.g., UE 104), and may correspond to the CPS 212 and IMS circuitry 214 of FIG. 2. The IMS server 612 may correspond to the IMS server 112 of FIG. 1 and/or IMS server 300 of FIG. 3. The process 600 depicted in FIG. 6 may use a new message (different from the SIP register message) to both reject the SIP invite and deregister the UE from voice services in response to receiving an SIP invite when the UE is in the CE mode B.

As shown, the CPS 604 may send an indication 616 to the IMS circuitry 608 to indicate that the UE has transitioned or will transition to the CE mode B. Thereafter, the IMS server 612 may send an SIP invite 620 to the IMS circuitry 608 of the UE. The SIP 620 may be an invitation for the UE to engage in an MT voice call. The IMS circuitry 608 may send a message 624 to the IMS server 612 in response to the SIP invite 620. The message 624 may indicate to the IMS server 612 that the SIP invite 620 is rejected and that the UE requests deregistration from voice services. In some embodiments, the message 624 may also deregister the UE from video services. Furthermore, in some embodiments, the message 624 may omit one or more fields that are included in an SIP register message, thereby conserving message size.

At 628, the IMS server 612 may mark the UE as temporarily not available for voice calls. The CPS 604 may thereafter send a message 632 to the IMS circuitry 608 to indicate that the UE has transitioned or will transition to the CE mode A or normal coverage mode. The CPS 604 may send the message 632, for example, if radio conditions on the wireless communication network have improved above a signal quality level. The IMS circuitry 608 may send an SIP register message 636 to the IMS server 612 responsive to the message 632. The SIP register message 636 may re-register the UE for voice services. The IMS server 612 may delete and/or modify the stored mark that the UE was not available for voice calls. Accordingly, the UE may again be available to receive MT voice calls via the IMS server 612.

Embodiments described herein may be implemented into a system using any suitably configured hardware and/or software. FIG. 2 illustrates, for one embodiment, example components of an electronic device 200. As discussed above, the electronic device 200 may be, implement, be incorporated into, or otherwise be a part of a UE (e.g., UE 104 and/or UE 108) or another device, such as an access point (e.g., access point 116 and/or 120) or IMS server (e.g., IMS server 112). Additionally, as discussed above, the electronic device 200 may include application circuitry 202, baseband circuitry 204, Radio Frequency (RF) circuitry 206, front-end module (FEM) circuitry 208 and one or more antennas 210, coupled together at least as shown. In embodiments where the electronic device 200 is implemented in or by an access point or IMS server, the electronic device 200 may also include network interface circuitry (not shown) for communicating over a wired interface (for example, an X2 interface, an S1 interface, and the like).

The application circuitry 202 may include one or more application processors. For example, the application circuitry 202 may include circuitry such as, but not limited to, one or more single-core or multi-core processors 202a. The processor(s) 202a may include any combination of general-purpose processors and dedicated processors (e.g., graphics processors, application processors, etc.). The processors 202a may be coupled with and/or may include computer-readable media 202b (also referred to as "CRM 202b", "memory 202b", "storage 202b", or "memory/storage 202b") and may be configured to execute instructions stored in the CRM 202b to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband circuitry 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, and/or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, and the like. In some embodiments, modulation/demodulation circuitry of the baseband circuitry 204 may include Fast-Fourier Transform (FFT), precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC, PDCP and/or RRC layers. In various embodiments, baseband circuitry 204 may implement the CPS 212 of a UE (e.g., UE 104 and/or UE 108) as described herein.

In some embodiments, the baseband circuitry may include one or more audio digital signal processor(s) (DSP) 204f. The audio DSP(s) 204f may include elements for compression/decompression and echo cancellation and may include other suitable processing elements in other embodiments. The baseband circuitry 204 may further include computer-readable media 204g (also referred to as "CRM 204g", "memory 204g", "storage 204g", or "memory/storage 204b"). The CRM 204g may be used to load and store data and/or instructions for operations performed by the processors of the baseband circuitry 204. For example, the CRM 204g may load and store data and/or instructions that, when executed by one or more processors of the baseband circuitry 204, cause the baseband circuitry 204 to implement the techniques described herein, such as aspects of the process 500 and/or 600.

CRM 204g for one embodiment may include any combination of suitable volatile memory and/or non-volatile memory. The CRM 204g may include any combination of various levels of memory/storage including, but not limited to, read-only memory (ROM) having embedded software instructions (e.g., firmware), random access memory (e.g., dynamic random access memory (DRAM)), cache, buffers, etc.). The CRM 204g may be shared among the various processors or dedicated to particular processors. Components of the baseband circuitry 204 may be suitably combined in a single chip, a single chipset, or disposed on a same circuit board in some embodiments. In some embodiments, some or all of the constituent components of the baseband circuitry 204 and the application circuitry 202 may be implemented together, such as, for example, on a system on a chip (SOC).

In some embodiments, the baseband circuitry 204 may provide for communication compatible with one or more radio technologies. For example, in some embodiments, the baseband circuitry 204 may support communication with an E-UTRAN and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc., to facilitate the communication with the wireless network. RF circuitry 206 may include a receive signal path that may include circuitry to down-convert RF signals received from the FEM circuitry 208 and provide baseband signals to the baseband circuitry 204. RF circuitry 206 may also include a transmit signal path that may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206*d* for synthesizing a frequency for use by the mixer circuitry 206*a* of the receive signal path and the transmit signal path. In some embodiments, the mixer circuitry 206*a* of the receive signal path may be configured to down-convert RF signals received from the FEM circuitry 208 based on the synthesized frequency provided by synthesizer circuitry 206*d*. The amplifier circuitry 206*b* may be configured to amplify the down-converted signals and the filter circuitry 206*c* may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206*a* of the receive signal path may comprise passive mixers, although the scope of the embodiments is not limited in this respect.

In some embodiments, the mixer circuitry 206*a* of the transmit signal path may be configured to up-convert input baseband signals based on the synthesized frequency provided by the synthesizer circuitry 206*d* to generate RF output signals for the FEM circuitry 208. The baseband signals may be provided by the baseband circuitry 204 and may be filtered by filter circuitry 206*c*. The filter circuitry 206*c* may include a low-pass filter (LPF), although the scope of the embodiments is not limited in this respect.

In some embodiments, the mixer circuitry 206*a* of the receive signal path and the mixer circuitry 206*a* of the transmit signal path may include two or more mixers and may be arranged for quadrature downconversion and/or upconversion, respectively. In some embodiments, the mixer circuitry 206*a* of the receive signal path and the mixer circuitry 206*a* of the transmit signal path may include two or more mixers and may be arranged for image rejection (e.g., Hartley image rejection). In some embodiments, the mixer circuitry 206*a* of the receive signal path and the mixer circuitry 206*a* of the transmit signal path may be arranged for direct downconversion and/or direct upconversion, respectively. In some embodiments, the mixer circuitry 206*a* of the receive signal path and the mixer circuitry 206*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206*d* may be a fractional-N synthesizer or a fractional N/N+1 synthesizer, although the scope of the embodiments is not limited in this respect, as other types of frequency synthesizers may be suitable. For example, synthesizer circuitry 206*d* may be a delta-sigma synthesizer, a frequency multiplier, or a synthesizer comprising a phase-locked loop with a frequency divider. The synthesizer circuitry 206*d* may be configured to synthesize an output frequency for use by the mixer circuitry 206*a* of the RF circuitry 206 based on a frequency input and a divider control input. In some embodiments, the synthesizer circuitry 206*d* may be a fractional N/N+1 synthesizer.

In some embodiments, frequency input may be provided by a voltage controlled oscillator (VCO), although that is not a requirement. Divider control input may be provided by either the baseband circuitry 204 or the application circuitry 202 depending on the desired output frequency. In some embodiments, a divider control input (e.g., N) may be determined from a look-up table based on a channel indicated by the application circuitry 202.

Synthesizer circuitry 206*d* of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path that may include circuitry configured to operate on RF signals received from one or more antennas 210, amplify the received signals and provide the amplified versions of the received signals to the RF circuitry 206 for further processing. FEM circuitry 208 may also include a transmit signal path that may include circuitry configured to amplify signals for transmission provided by the RF circuitry 206 for transmission by one or more of the one or more antennas 210. In some embodiments, the FEM circuitry 208 may include a TX/RX switch to switch between transmit mode and receive mode operation. The FEM circuitry 208 may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the electronic device 200 may include additional elements such as, for example, a display, a camera, one or more sensors, and/or interface circuitry (for example, input/output (I/O) interfaces or buses) (not shown). In embodiments where the electronic device is implemented in or by a base station (e.g., eNB or gNB) or an access point, the electronic device 200 may include network interface circuitry. The network interface circuitry may be one or more computer hardware components that connect electronic device 200 to one or more network elements, such as one or more servers within a core network or one or more other base stations or access points via a wired connection. To this end, the network interface circuitry may include one or more dedicated processors and/or field programmable gate arrays (FPGAs) to communicate using one or more network communications protocols such as X2 application protocol (AP), S1 AP, Stream Control Transmission Protocol (SCTP), Ethernet, Point-to-Point (PPP), Fiber Distributed Data Interface (FDDI), and/or any other suitable network communications protocols.

Figure 7:
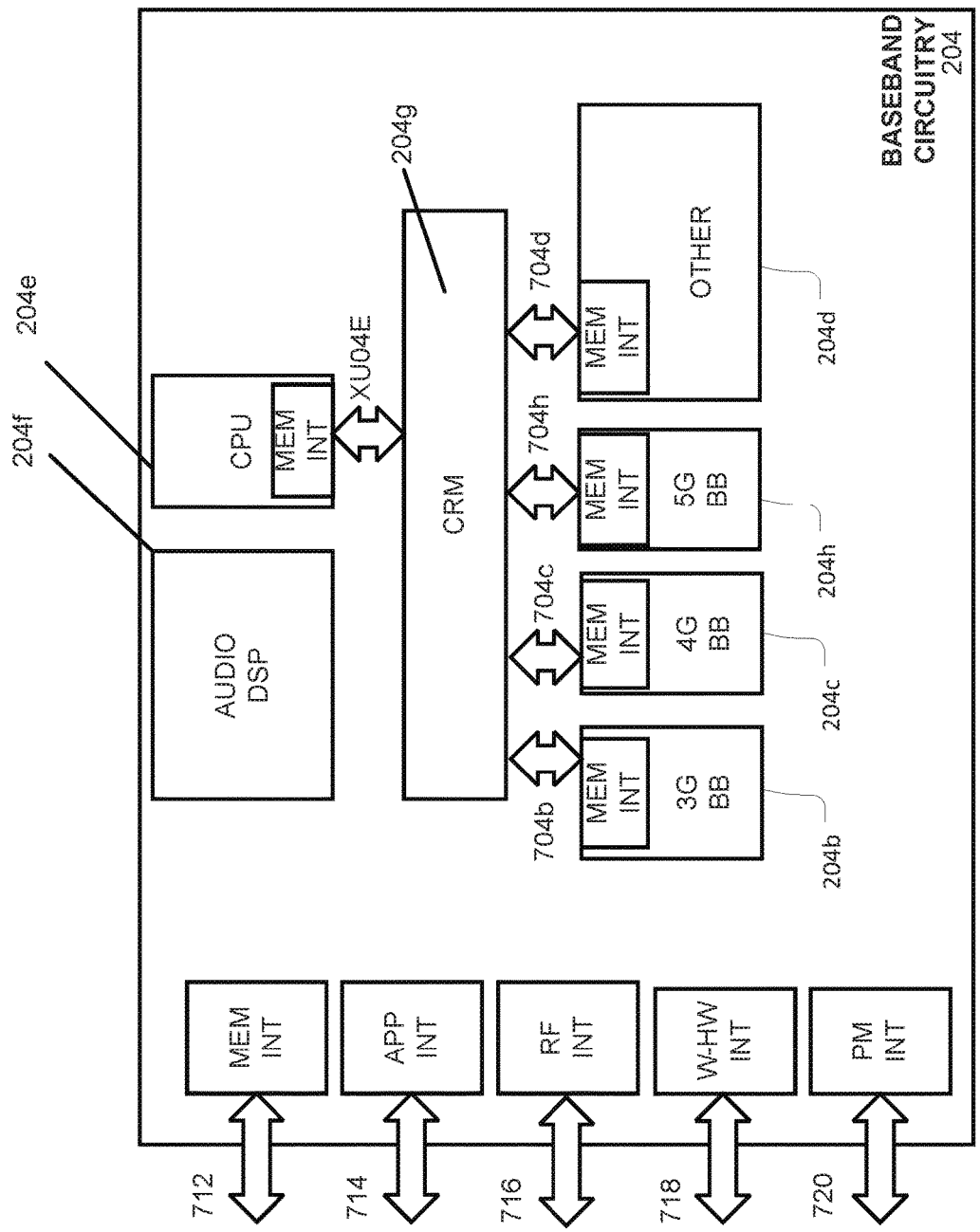
FIG. 7 illustrates baseband circuitry in accordance with some embodiments.

FIG. 7 illustrates example interfaces of baseband circuitry 204 in accordance with some embodiments. As discussed above, the baseband circuitry 204 of FIG. 2 may comprise processors and CRM 204g utilized by said processors. Each of the processors 204b, 204c, 204h, 204d, and 204g may include a memory interface, 204b, 204c, 204h, 204d, and 204g, respectively, to send/receive data to/from the CRM 204g.

The baseband circuitry 204 may further include one or more interfaces to communicatively couple to other circuitries/devices, such as a memory interface 712 (for example, an interface to send/receive data to/from memory external to the baseband circuitry 204), an application circuitry interface 714 (for example, an interface to send/receive data to/from the application circuitry 202 of FIG. 2), an RF circuitry interface 716 (for example, an interface to send/receive data to/from RF circuitry 206 of FIG. 2), a wireless hardware connectivity interface 718 (for example, an interface to send/receive data to/from Near Field Communication (NFC) components, Bluetooth® components (for example, Bluetooth® Low Energy), Wi-Fi® components, and other communication components), and a power management interface 720 (for example, an interface to send/receive power or control signals to/from a power management controller.

Figure 8:
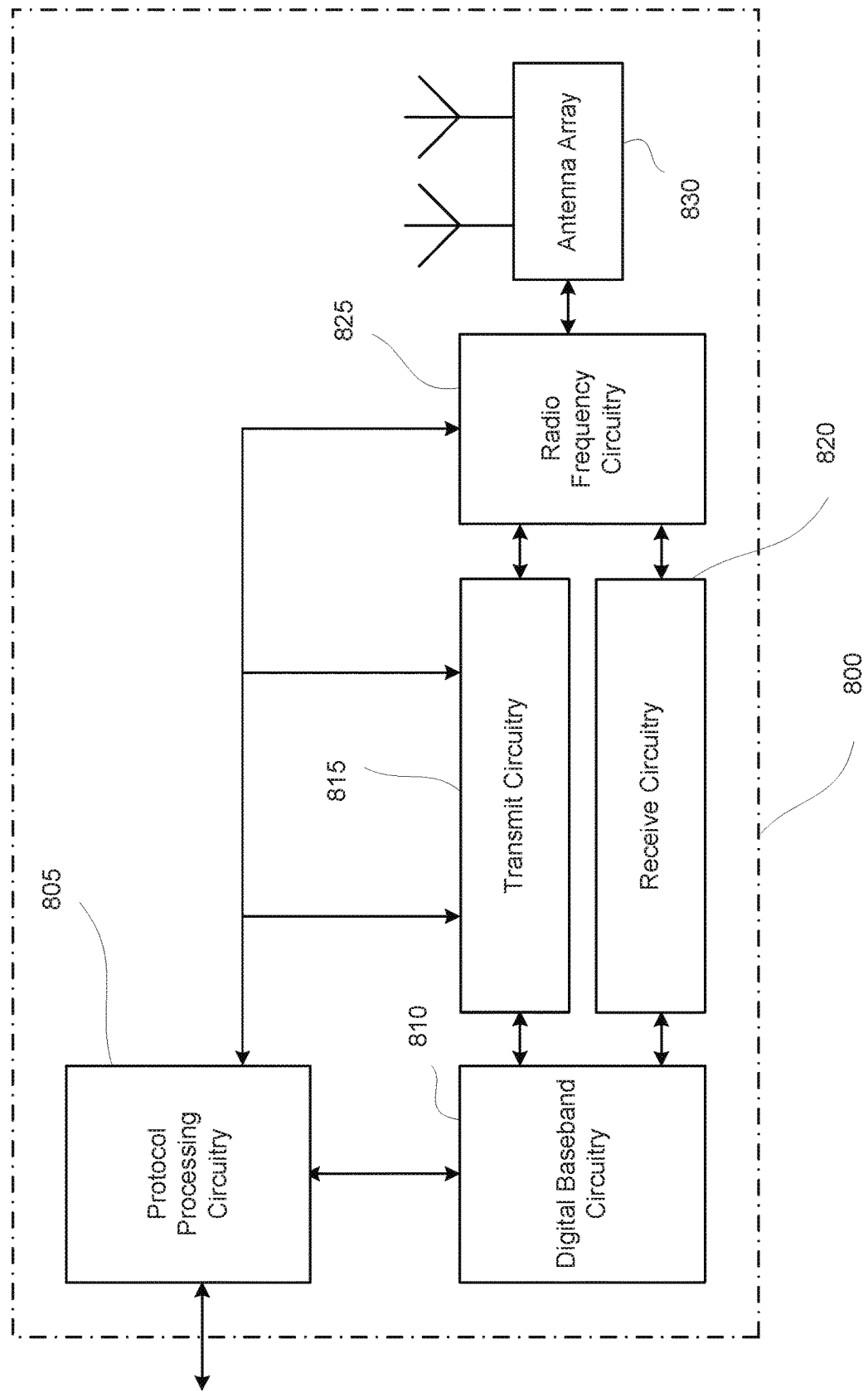
FIG. 8 illustrates communication circuitry in accordance with some embodiments.

FIG. 8 illustrates communication circuitry 800 according to some aspects. Communication circuitry 800 may be similar to, and substantially interchangeable with components of electronic device 200. Components as shown in communication circuitry 800 are shown here for illustrative purposes and may include other components not shown here in FIG. 8.

Communication circuitry 800 may include protocol processing circuitry 805 may correspond to CPU 204e, processor 202a, etc. The protocol processing circuitry may implement one or more of MAC, RLC, PDCP, RRC and non-access stratum ("NAS") functions of a cellular protocol stack (e.g., CPS 212). Protocol processing circuitry 805 may include one or more processing cores (not shown, but similar to those described elsewhere herein) to execute instructions and one or more memory structures (not shown, but similar to those described elsewhere herein) to store program and data information.

Communication circuitry 800 may further include digital baseband circuitry 810, which may be similar to baseband processors of the baseband circuitry 204. The digital baseband circuitry 810 may implement PHY layer functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Communication circuitry 800 may further include transmit circuitry 815, receive circuitry 820 and/or antenna array circuitry 830.

Communication circuitry 800 may further include RF circuitry 825, which may correspond to RF circuitry 206 or FEM 208. In an aspect of the invention, RF circuitry 825 may include multiple parallel RF chains for one or more of transmit or receive functions, each connected to one or more antennas of the antenna array 830.

In an aspect of the disclosure, protocol processing circuitry 805 may include one or more instances of control circuitry (not shown) to provide control functions for one or more of digital baseband circuitry 810, transmit circuitry 815, receive circuitry 820, and/or radio frequency circuitry 825.

In some embodiments, communication circuitry 800 may be specifically configured for millimeter wave communications. For example, the communication circuitry 800 may have a hybrid beamforming architecture in which precoding and combining are done in both baseband and RF sections. For example, the digital baseband circuitry 810 may implement a baseband precoder (in transmitter) and combiner (in receiver) using digital signal processing, while RF circuitry 825 may implement RF precoding (in transmitter) and combiner (in receiver) using phase shifters.

Figure 9:
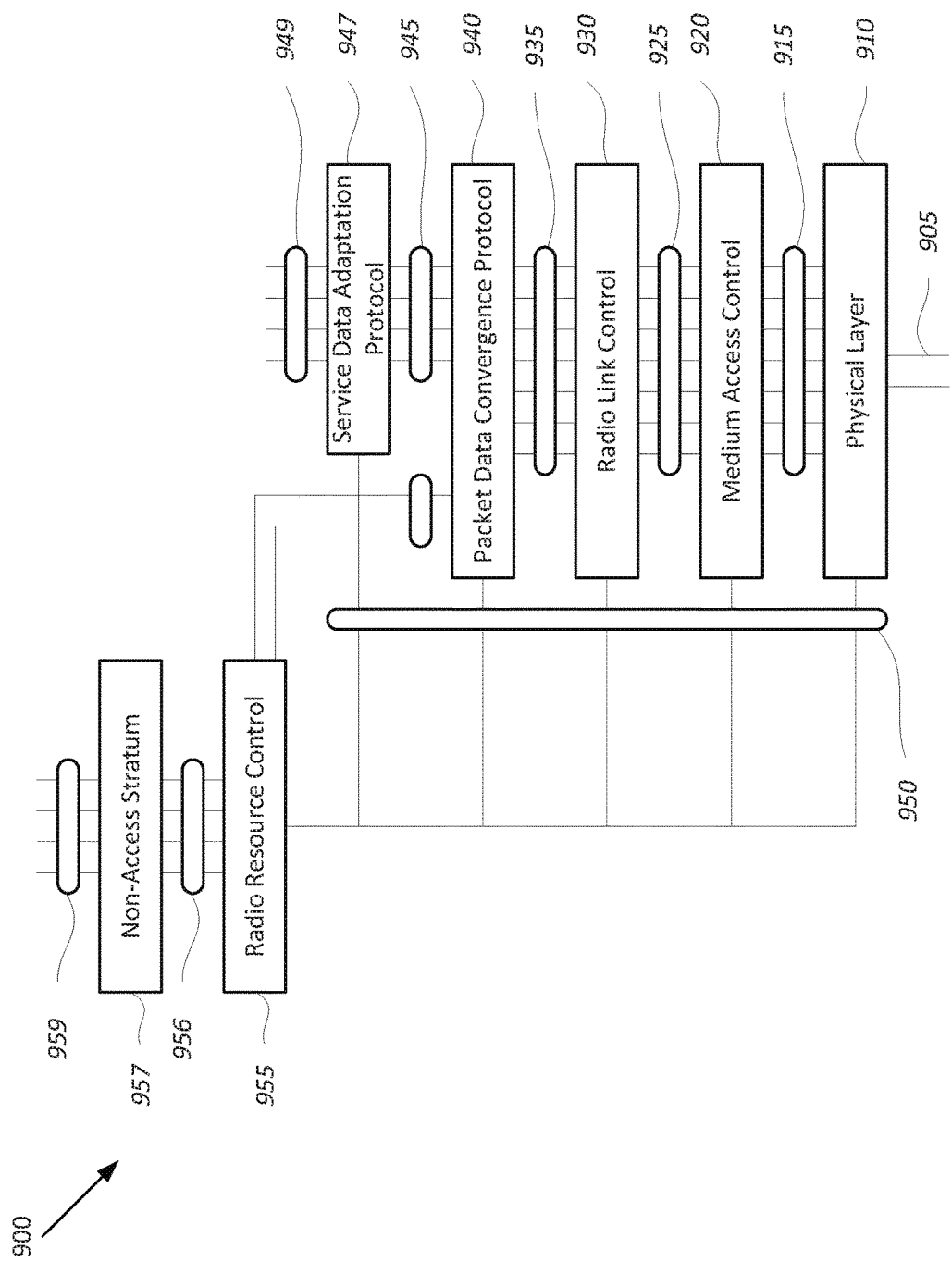
FIG. 9 illustrates a cellular protocol stack in accordance with some embodiments.

FIG. 9 illustrates protocol layers of a cellular protocol stack 900 that may be implemented in a wireless communication device according to some aspects. Cellular protocol stack 900 may correspond to the CPS 212 of UE 104 in some embodiments. Additionally, or alternatively, one or more layers of the cellular protocol stack 900 may be implemented in an access node (e.g., access node 116 and/or 120) or a network function entity, such as an MME. One or more of the protocol layers of cellular protocol stack 900 may perform operations as described herein related to management of operation of a UE in the CE mode B.

In some aspects, protocol layers may include one or more of physical layer (PHY) 910, medium access control layer (MAC) 920, radio link control layer (RLC) 930, packet data convergence protocol layer (PDCP) 940, service data adaptation protocol (SDAP) layer 947, radio resource control layer (RRC) 955, and non-access stratum (NAS) layer 957, in addition to other higher layer functions not illustrated.

According to some aspects, protocol layers may include one or more service access points that may provide communication between two or more protocol layers.

According to some aspects, PHY 910 may transmit and receive physical layer signals 905 that may be received or transmitted respectively by one or more other communication devices. According to some aspects, physical layer signals 905 may comprise one or more physical channels.

According to some aspects, an instance of PHY 910 may process requests from and provide indications to an instance of MAC 920 via one or more physical layer service access points (PHY-SAP) 915. According to some aspects, requests and indications communicated via PHY-SAP 915 may comprise one or more transport channels.

According to some aspects, an instance of MAC 910 may process requests from and provide indications to an instance of RLC 930 via one or more medium access control service access points (MAC-SAP) 925. According to some aspects, requests and indications communicated via MAC-SAP 925 may comprise one or more logical channels.

According to some aspects, an instance of RLC 930 may process requests from and provide indications to an instance of PDCP 940 via one or more radio link control service access points (RLC-SAP) 935. According to some aspects, requests and indications communicated via RLC-SAP 935 may comprise one or more RLC channels.

According to some aspects, an instance of PDCP 940 may process requests from and provide indications to one or more of an instance of RRC 955 and one or more instances of SDAP 947 via one or more packet data convergence protocol service access points (PDCP-SAP) 945. According to some aspects, requests and indications communicated via PDCP-SAP 945 may comprise one or more radio bearers.

According to some aspects, an instance of SDAP 947 may process requests from and provide indications to one or more higher layer protocol entities via one or more service data adaptation protocol service access points (SDAP-SAP) 949. According to some aspects, requests and indications communicated via SDAP-SAP 949 may comprise one or more quality of service (QoS) flows.

According to some aspects, RRC entity 955 may configure, via one or more management service access points (M-SAP), aspects of one or more protocol layers, which may include one or more instances of PHY 910, MAC 920, RLC 930, PDCP 940 and SDAP 947. According to some aspects, an instance of RRC 955 may process requests from and provide indications to one or more NAS entities via one or more RRC service access points (RRC-SAP) 956.

Figure 10:
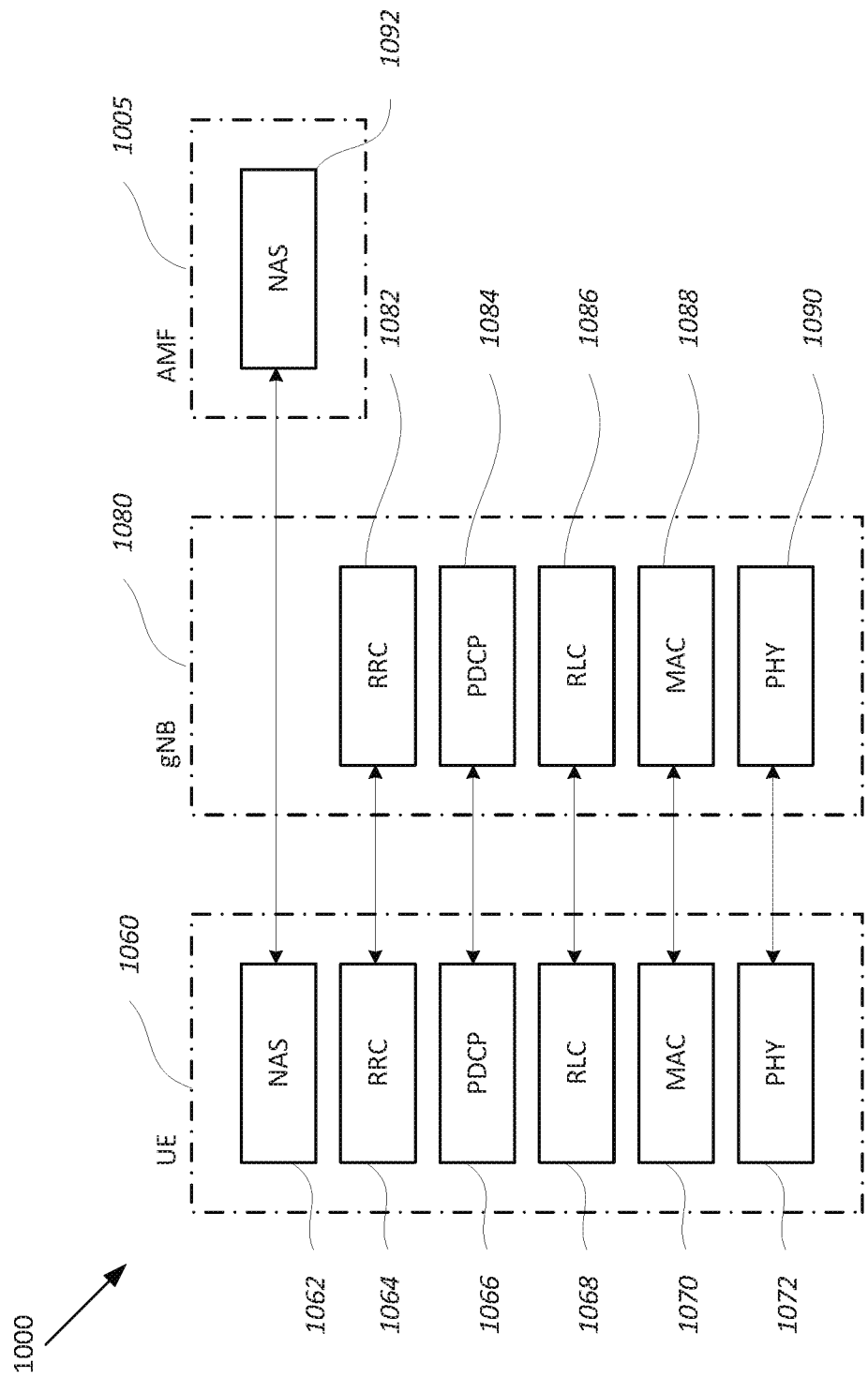
FIG. 10 illustrates protocol entities that may be implemented in wireless communication devices, in accordance with some embodiments.

FIG. 10 illustrates protocol entities that may be implemented in wireless communication devices, including one or more of a user equipment (UE) 1060, a base station, which may be termed an evolved node B (eNB), or new radio node B (gNB) 1080, and a network function, which may be termed a mobility management entity (MME), or an access and mobility management function (AMF) 1094, according to some aspects. The UE 1060 may correspond to the UE 104 and/or UE 108. Additionally, or alternatively, the gNB 1080 may correspond to the access node 116 and/or access node 120.

According to some aspects, access node 1080 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAN).

According to some aspects, one or more protocol entities that may be implemented in one or more of UE 1060, gNB 1080 and AMF 1094, may be described as implementing all or part of a protocol stack in which the layers are considered to be ordered from lowest to highest in the order PHY, MAC, RLC, PDCP, RRC and NAS. According to some aspects, one or more protocol entities that may be implemented in one or more of UE 1060, gNB 1080 and AMF 1094, may communicate with a respective peer protocol entity that may be implemented on another device, using the services of respective lower layer protocol entities to perform such communication.

According to some aspects, UE PHY 1072 and peer entity gNB PHY 1090 may communicate using signals transmitted and received via a wireless medium. According to some aspects, UE MAC 1070 and peer entity gNB MAC 1088 may communicate using the services provided respectively by UE PHY 1072 and gNB PHY 1090. According to some aspects, UE RLC 1068 and peer entity gNB RLC 1086 may communicate using the services provided respectively by UE MAC 1070 and gNB MAC 1088. According to some aspects, UE PDCP 1066 and peer entity gNB PDCP 1084 may communicate using the services provided respectively by UE RLC 1068 and 5 GNB RLC 1086. According to some aspects, UE RRC 1064 and gNB RRC 1082 may communicate using the services provided respectively by UE PDCP 1066 and gNB PDCP 1084. According to some aspects, UE NAS 1062 and AMF NAS 1092 may communicate using the services provided respectively by UE RRC 1064 and gNB RRC 1082.

Figure 11:
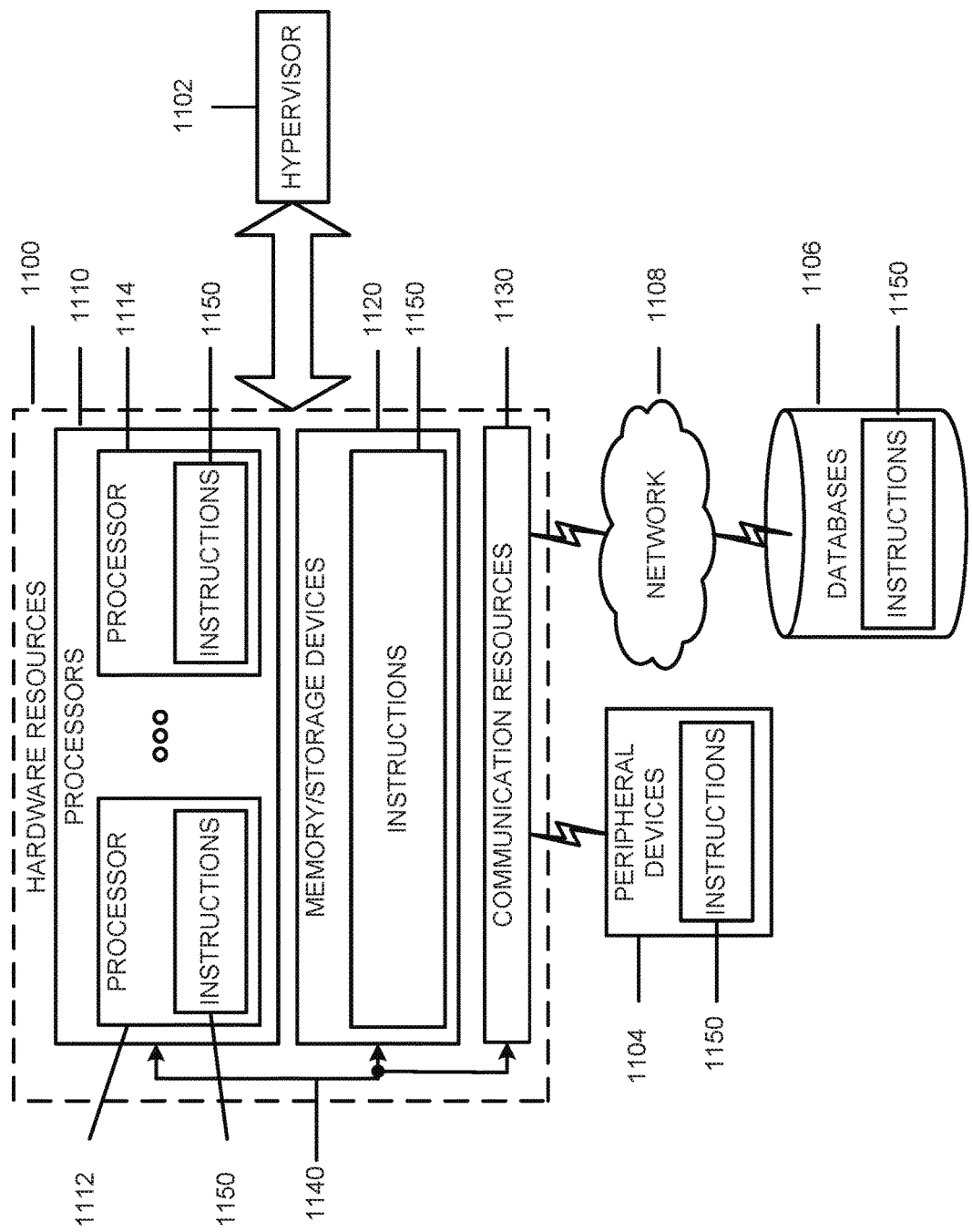
FIG. 11 illustrates hardware resources in accordance with some embodiments.

FIG. 11 is a block diagram illustrating components, according to some example embodiments, able to read instructions from a machine-readable or computer-readable medium (for example, a non-transitory machine-readable storage medium) and perform any one or more of the processes for management of operation by a UE in the CE mode B discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For embodiments where node virtualization (for example, network function virtualization ("NFV")) is utilized, a hypervisor 1102 may be executed to provide an execution environment for one or more network slices/sub-slices to utilize the hardware resources 1100.

The processors 1110 (for example, a CPU, a reduced instruction set computing ("RISC") processor, a complex instruction set computing ("CISC") processor, a graphics processing unit ("GPU"), a digital signal processor ("DSP") such as a baseband processor, an application specific integrated circuit ("ASIC"), a radio-frequency integrated circuit ("RFIC"), another processor, or any suitable combination thereof) may include, for example, a processor 1112 and a processor 1114. The processors may correspond to any processors of the AN 106 or the UE 108 described herein.

The memory/storage devices 1120 may include main memory, disk storage, or any suitable combination thereof. The memory/storage devices 1120 may include, but are not limited to, any type of volatile or non-volatile memory such as dynamic random access memory ("DRAM"), static random-access memory ("SRAM"), erasable programmable read-only memory ("EPROM"), electrically erasable programmable read-only memory ("EEPROM"), Flash memory, solid-state storage, etc. The memory/storage devices 1120 may correspond to CRM 202b of FIG. 2.

The communication resources 1130 may include interconnection or network interface components or other suitable devices to communicate with one or more peripheral devices 1104 or one or more databases 1106 via a network 1108. For example, the communication resources 1130 may include wired communication components (for example, for coupling via a Universal Serial Bus ("USB")), cellular communication components, near-field communication ("NFC") components, Bluetooth® components (for example, Bluetooth® Low Energy), Wi-Fi® components, and other communication components.

Instructions 1150 may comprise software, a program, an application, an applet, an app, or other executable code for causing at least any of the processors 1110 to perform any one or more of the methodologies discussed herein.

The instructions 1150 may cause the processors 1110 to perform the process 500, the process 600, or other operations of a UE and/or IMS server described herein.

The instructions 1150 may reside, completely or partially, within at least one of the processors 1110 (for example, within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/ storage devices 1120, the peripheral devices 1104, and the databases 1106 are examples of computer-readable and machine-readable media.

The resources described in FIG. 11 may also be referred to as circuitry. For example, communication resources 1130 may also be referred to as communication circuitry 1130.

Some non-limiting Examples of various embodiments are provided below.

Example 1 is one or more computer-readable media having instructions, stored thereon, that when executed by one or more processors, are to cause a user equipment (UE) to: determine that the UE is to transition to a coverage enhancement (CE) mode B based on radio conditions on a wireless communication network; transition the UE to the CE mode B based on the determination; process a session initiation protocol (SIP) invite received from an internet protocol (IP) multimedia services (IMS) server, the SIP invite to request initiation of a voice call; and reject the SIP invite and deregister the UE from voice services on the wireless communication network in response to the SIP invite and based on operation of the UE in the CE mode B.

Example 2 is the one or more media of Example 1, wherein, to deregister the UE from voice services, the instructions, when executed, are to cause the UE to transmit an SIP register message to the IMS server.

Example 3 is the one or more media of Example 2, wherein, to reject the SIP invite, the instructions are to cause the UE to transmit a message to the IMS server to indicate that the UE is temporarily unavailable.

Example 4 is the one or more media of Example 1, wherein, to reject the SIP invite and deregister the UE from voice services, the instructions, when executed, are to cause the UE to transmit a single message to the IMS server to indicate to the IMS server that the SIP invite is rejected and request deregistration of the UE from voice services.

Example 5 is the one or more media of any one of Examples 1 to 4, wherein the instructions, when executed, are further to cause the UE to: determine that the UE is to transition to a CE mode A or a normal coverage mode based on updated radio conditions on the wireless communication network; transition the UE to the CE mode A or the normal coverage mode; and re-register for voice services on the wireless communication network based on the transition to the CE mode A or the normal coverage mode.

Example 6 is the one or more media of any one of Examples 1 to 5, wherein the instructions, when executed, are further to cause the UE to reject a mobile originated (MO) call request to initiate a voice call when the UE is in the CE mode B.

Example 7 is the one or more media of any one of Examples 1 to 6, wherein the determination and transition are performed when the UE is configured as a data centric UE, and wherein the UE is not to use the CE mode B when the UE is configured as a voice centric UE.

Example 8 is the one or more media of any one of Examples 1 to 7, wherein the instructions, when executed, are further to cause the UE to display an indicator to indicate to a user of the UE that voice services are unavailable based on the determination that the UE is to transition to the CE mode B.

Example 9 is one or more computer-readable media having instructions, stored thereon, that when executed by one or more processors, are to cause a internet protocol (IP) multimedia services (IMS) server to: transmit a session initiation protocol (SIP) invite to a first user equipment (UE); obtain, from the first UE responsive to the SIP invite, a request to deregister the first UE from voice services on a wireless communication network; obtain a mobile terminated (MT) call trigger from a second UE to initiate an MT call with the first UE; and reject the MT call trigger based on the request to deregister the first UE from voice services.

Example 10 is the one or more media of Example 9, wherein the request to deregister is an SIP register message.

Example 11 is the one or more media of Example 10, wherein the instructions, when executed, are further to cause the IMS server to obtain a message from the first UE to indicate that the first UE is temporarily unavailable.

Example 12 is the one or more media of Example 9, wherein the request to deregister the first UE from voice services is included in a message that also indicates that the SIP invite is rejected.

Example 13 is the one or more media of any one of Examples 9 to 12, wherein the instructions, when executed, are further to cause the IMS server to obtain an SIP register message from the first UE to re-register the first UE for voice services.

Example 14 is an apparatus to be employed by a user equipment (UE), the apparatus comprising: a cellular protocol stack to determine that radio conditions on a wireless communication network are below a quality level; and internet protocol (IP) multimedia services (IMS) circuitry coupled to the cellular protocol stack. The IMS circuitry is to: receive an indication from the cellular protocol stack that the radio conditions are below the quality level; receive a session initiation protocol (SIP) invite from an IMS server to request initiation of a voice call; and reject the SIP invite and deregister from voice services on the wireless communication network in response to the SIP invite and based on the indication that the radio conditions are below the quality level.

Example 15 is the apparatus of Example 14, wherein the IMS circuitry is to transition the UE to a coverage enhancement (CE) mode B based on the indication that the radio conditions are below the threshold.

Example 16 is the apparatus of Example 14, wherein the IMS circuitry is to reject the SIP invite and deregister from voice services when the UE is configured as a data centric UE, and wherein the UE is not to use the CE mode B when the UE is configured as a voice centric UE.

Example 17 is the apparatus of Example 14, wherein: to reject the SIP invite, the IMS circuitry is to transmit a message to the IMS server to indicate that the UE is temporarily unavailable; and to deregister the UE from voice services, the IMS circuitry is to transmit an SIP register message to the IMS server.

Example 18 is the apparatus of Example 14, wherein, to reject the SIP invite and deregister the UE from voice services, the IMS circuitry is to transmit a single message to the IMS server to indicate to the IMS server that the SIP invite is rejected and request deregistration of the UE from voice services.

Example 19 is the apparatus of Example 14, wherein the cellular protocol stack is to determine that the radio conditions on the wireless communication network are above a quality level; and wherein the IMS circuitry is to: receive an indication from the cellular protocol stack that the radio conditions are above the quality level; and transmit an SIP register message to the IMS server to re-register for voice services on the wireless communication network based on the indication that the radio conditions are above the quality level.

Example 20 is the apparatus of Example 14, wherein the IMS circuitry is further to: receive, from the cellular protocol stack, a mobile originated (MO) call request to request initiation of a voice call; and reject the MO call request based on the indication that the radio conditions are below the quality level.

Example 21 is the apparatus of Example 14, wherein the IMS circuitry is further to cause the UE to display an indicator to indicate to a user of the UE that voice services are unavailable based on the indication that the radio conditions are below the quality level.

Example 22 is the apparatus of any one of Examples 14 to 21, wherein the radio conditions include one or more of a channel quality indicator (CQI), a received signal received power, a received signal received quality, a received signal strength indicator, a signal-to-noise ratio, or a signal-to-noise-plus-interference ratio, and wherein the quality level corresponds to one or more thresholds.

Example 23 is an apparatus to be employed by a user equipment (UE), the apparatus comprising: means to determine that the UE is to transition to a coverage enhancement (CE) Mode B in a wireless communication network; means to transition the UE to the CE mode B based on the determination; means to receive a session initiation protocol (SIP) invite from an internet protocol (IP) multimedia services (IMS) server to request initiation of a mobile terminated (MT) voice call; and means to deregister the UE from voice services on the wireless communication network in response to the SIP invite and based on operation of the UE in the CE mode B.

Example 24 is the apparatus of Example 23, wherein the means to deregister the UE from voice services includes: means to transmit an SIP register message to the IMS server and means to transmit a message to the IMS server to indicate that the UE is temporarily unavailable; or means to transmit a single message to the IMS server to indicate to the IMS server that the SIP invite is rejected and request deregistration of the UE from voice services.

Example 25 is the apparatus of Example 23 or 24, wherein the means to transition the UE to the CE mode B is to transition the UE to the CE mode B based on the determination when the UE is configured as a data centric UE, and wherein the UE is not to deregister from the voice services when the UE is configured as a voice centric UE.

Example 26 is a method to be performed by a user equipment (UE), the method comprising: determining that the UE is to transition to a coverage enhancement (CE) mode B based on radio conditions on a wireless communication network; transitioning the UE to the CE mode B based on the determination; processing a session initiation protocol (SIP) invite received from an internet protocol (IP) multimedia services (IMS) server, the SIP invite to request initiation of a voice call; and rejecting the SIP invite and deregistering the UE from voice services on the wireless communication network in response to the SIP invite and based on operation of the UE in the CE mode B.

Example 27 is the method of Example 26, wherein deregistering the UE from voice services includes transmit an SIP register message to the IMS server.

Example 28 is the method of Example 27, wherein rejecting the SIP invite includes transmitting a message to the IMS server to indicate that the UE is temporarily unavailable.

Example 29 is the method of Example 26, wherein rejecting the SIP invite and deregistering the UE from voice services includes transmitting a single message to the IMS server to indicate to the IMS server that the SIP invite is rejected and request deregistration of the UE from voice services.

Example 30 is the method of any one of Examples 26 to 29, further comprising determining that the UE is to transition to a CE mode A or a normal coverage mode based on updated radio conditions on the wireless communication network; transitioning the UE to the CE mode A or the normal coverage mode; and re-registering for voice services on the wireless communication network based on the transition to the CE mode A or the normal coverage mode.

Example 31 is the method of Examples 26 to 30, further comprising rejecting a mobile originated (MO) call request to initiate a voice call when the UE is in the CE mode B.

Example 32 is the method of any one of Examples 26 to 31, wherein the determining and transitioning are performed when the UE is configured as a data centric UE, and wherein the UE is not to use the CE mode B when the UE is configured as a voice centric UE.

Example 33 is the method of any one of Examples 26 to 32, further comprising displaying, on a display of the UE, an indicator to indicate to a user of the UE that voice services are unavailable based on the determination that the UE is to transition to the CE mode B.

Example 34 is a method to be performed by an internet protocol (IP) multimedia services (IMS) server, the method comprising: transmitting a session initiation protocol (SIP) invite to a first user equipment (UE); obtaining, from the first UE responsive to the SIP invite, a request to deregister the first UE from voice services on a wireless communication network; obtaining a mobile terminated (MT) call trigger from a second UE to initiate an MT call with the first UE; and rejecting the MT call trigger based on the request to deregister the first UE from voice services.

Example 35 is the method of Example 34, wherein the request to deregister is an SIP register message.

Example 36 is the method of Example 35, further comprising obtaining a message from the first UE to indicate that the first UE is temporarily unavailable.

Example 37 is the method of Example 34, wherein the request to deregister the first UE from voice services is included in a message that also indicates that the SIP invite is rejected.

Example 38 is the method of any one of Examples 34 to 37, further comprising obtaining an SIP register message from the first UE to re-register the first UE for voice services.

Example 39 is an apparatus comprising means to perform the method of any one of claims 26 to 38.

Example 40 is an apparatus comprising circuitry to perform the method of any one of claims 26 to 38.

The present disclosure is described with reference to flowchart illustrations or block diagrams of methods, apparatus (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. One or more non-transitory computer-readable media having instructions, stored thereon, that when executed by one or more processors, are to cause a user equipment (UE) to:
    determine that the UE is to transition to a coverage enhancement (CE) mode B based on radio conditions on a wireless communication network;
    transition the UE to the CE mode B based on the determination;
    process a session initiation protocol (SIP) invite received from an internet protocol (IP) multimedia services (IMS) server, the SIP invite to request initiation of a voice call; and
    reject the SIP invite and deregister the UE from voice services on the wireless communication network in response to the SIP invite and based on operation of the UE in the CE mode B.

2. The one or more non-transitory media of claim 1, wherein, to deregister the UE from voice services, the instructions, when executed, are to cause the UE to transmit an SIP register message to the IMS server.

3. The one or more non-transitory media of claim 2, wherein, to reject the SIP invite, the instructions are to cause the UE to transmit a message to the IMS server to indicate that the UE is temporarily unavailable.

4. The one or more non-transitory media of claim 1, wherein, to reject the SIP invite and deregister the UE from voice services, the instructions, when executed, are to cause the UE to transmit a single message to the IMS server to indicate to the IMS server that the SIP invite is rejected and request deregistration of the UE from voice services.

5. The one or more non-transitory media of claim 1, wherein the instructions, when executed, are further to cause the UE to:
    determine that the UE is to transition to a CE mode A or a normal coverage mode based on updated radio conditions on the wireless communication network;
    transition the UE to the CE mode A or the normal coverage mode; and
    re-register for voice services on the wireless communication network based on the transition to the CE mode A or the normal coverage mode.

6. The one or more non-transitory media of claim 1, wherein the instructions, when executed, are further to cause the UE to reject a mobile originated (MO) call request to initiate a voice call when the UE is in the CE mode B.

7. The one or more non-transitory media of claim 1, wherein the determination and transition are performed when the UE is configured as a data centric UE, and wherein the UE is not to use the CE mode B when the UE is configured as a voice centric UE.

8. The one or more non-transitory media of claim 1, wherein the instructions, when executed, are further to cause the UE to display an indicator to indicate to a user of the UE that voice services are unavailable based on the determination that the UE is to transition to the CE mode B.

9. The one or more non-transitory computer-readable media of claim 1, wherein, to determine that the UE is to transition to the CE mode B based on radio conditions on the wireless communication network, the instructions are to cause the UE to:
    perform signal measurements for radio conditions on the wireless communication network, the signal measurements corresponding to one or more of a channel quality indicator, CQI, a received signal received power, RSRP, a received signal received quality, RSRQ, a received signal strength indicator, RSSI, a signal-to-noise ratio, SNR, or a signal-to-noise-plus-interference ratio, SINR; and
    determine that the UE is to transition to the CE mode B based at least on one or more thresholds corresponding to the signal measurements.

10. One or more non-transitory computer-readable media having instructions, stored thereon, that when executed by one or more processors, are to cause a internet protocol (IP) multimedia services (IMS) server to:
    transmit a session initiation protocol (SIP) invite to a first user equipment (UE);
    obtain, from the first UE responsive to the SIP invite, a request to deregister the first UE from voice services on a wireless communication network;
    obtain a mobile terminated (MT) call trigger from a second UE to initiate an MT call with the first UE; and
    reject the MT call trigger based on the request to deregister the first UE from voice services.

11. The one or more non-transitory media of claim 10, wherein the request to deregister is an SIP register message.

12. The one or more non-transitory media of claim 11, wherein the instructions, when executed, are further to cause the IMS server to obtain a message from the first UE to indicate that the first UE is temporarily unavailable.

13. The one or more non-transitory media of claim 10, wherein the request to deregister the first UE from voice services is included in a message that also indicates that the SIP invite is rejected.

14. The one or more non-transitory media of claim 10, wherein the instructions, when executed, are further to cause the IMS server to obtain an SIP register message from the first UE to re-register the first UE for voice services.

15. An apparatus to be employed by a user equipment (UE), the apparatus comprising:
    circuitry to implement a cellular protocol stack to determine that radio conditions on a wireless communication network are below a quality level; and internet protocol (IP) multimedia services (IMS) circuitry coupled to the cellular protocol stack, the IMS circuitry to:
receive an indication from the cellular protocol stack that the radio conditions are below the quality level;
receive a session initiation protocol (SIP) invite from an IMS server to request initiation of a voice call; and
reject the SIP invite and deregister from voice services on the wireless communication network in response to the SIP invite and based on the indication that the radio conditions are below the quality level.

16. The apparatus of claim 15, wherein the IMS circuitry is to transition the UE to a coverage enhancement (CE) mode B based on the indication that the radio conditions are below the quality level.

17. The apparatus of claim 16, wherein the IMS circuitry is to reject the SIP invite and deregister from voice services when the UE is configured as a data centric UE, and wherein the UE is not to use the CE mode B when the UE is configured as a voice centric UE.

18. The apparatus of claim 15, wherein:
to reject the SIP invite, the IMS circuitry is to transmit a message to the IMS server to indicate that the UE is temporarily unavailable; and
to deregister the UE from voice services, the IMS circuitry is to transmit an SIP register message to the IMS server.

19. The apparatus of claim 15, wherein, to reject the SIP invite and deregister the UE from voice services, the IMS circuitry is to transmit a single message to the IMS server to indicate to the IMS server that the SIP invite is rejected and request deregistration of the UE from voice services.

20. The apparatus of claim 15, wherein the circuitry to implement the cellular protocol stack is to determine that the radio conditions on the wireless communication network are above a quality level; and
wherein the IMS circuitry is to:
receive an indication from the circuitry to implement the cellular protocol stack that the radio conditions are above the quality level; and
transmit an SIP register message to the IMS server to re-register for voice services on the wireless communication network based on the indication that the radio conditions are above the quality level.

21. The apparatus of claim 15, wherein the IMS circuitry is further to:
receive, from the circuitry to implement the cellular protocol stack, a mobile originated (MO) call request to request initiation of a voice call; and
reject the MO call request based on the indication that the radio conditions are below the quality level.

22. The apparatus of claim 15, wherein the IMS circuitry is further to cause the UE to display an indicator to indicate to a user of the UE that voice services are unavailable based on the indication that the radio conditions are below the quality level.

23. The apparatus of claim 15, wherein the radio conditions include one or more of a channel quality indicator (CQI), a received signal received power, a received signal received quality, a received signal strength indicator, a signal-to-noise ratio, or a signal-to-noise-plus-interference ratio, and wherein the quality level corresponds to one or more thresholds.

24. A processor included in a user equipment (UE) for a cellular communication network, the processor comprising:
first circuitry to execute one or more instructions that cause the processor to perform operations comprising determining that radio conditions in the cellular communication network is below a quality level; and
second circuitry to execute one or more instructions that cause the processor to perform operations comprising:
transitioning the UE to a coverage enhancement (CE) mode B based on the determination about the radio conditions;
processing a session initiation protocol (SIP) invite received from an internet protocol (IP) multimedia services (IMS) server, the SIP invite to request initiation of a voice call; and
rejecting the SIP invite and deregister the UE from voice services on the cellular communication network in response to the SIP invite and based on operation of the UE in the CE mode B.

25. The processor of claim 24, wherein, to deregister the UE from voice services, the operations comprise at least one of:
transmitting a SIP register message to the IMS server, or
transmitting a message to the IMS server to indicate that the UE is temporarily unavailable.

26. The processor of claim 24, wherein the operations further comprise:
determining that the UE is to transition to a CE mode A or a normal coverage mode based on updated radio conditions on the cellular communication network;
transitioning the UE to the CE mode A or the normal coverage mode; and
re-registering for voice services on the cellular communication network based transitioning to the CE mode A or the normal coverage mode.

27. The processor of claim 24, wherein the determination and transition are performed when the UE is configured as a data centric UE, and wherein the UE is not to use the CE mode B when the UE is configured as a voice centric UE.

* * * * *

UNITED STATES PATENT AND TRADEMARK OFFICE
CERTIFICATE OF CORRECTION

PATENT NO. : 10,999,330 B2
APPLICATION NO. : 16/349587
DATED : May 4, 2021
INVENTOR(S) : Ahmed Soliman et al.

Page 1 of 1

It is certified that error appears in the above-identified patent and that said Letters Patent is hereby corrected as shown below:

On the Title Page

Item (72), Line 5, delete "Hillsboro, CA (US)" and insert -- Hillsboro, OR (US) --;

In the Claims

Column 22, Line 28, in Claim 9, delete "received signal received power, RSRP," and insert -- reference signal received power, RSRP, --;

Column 22, Line 29, in Claim 9, delete "received signal received quality, RSRQ," and insert -- reference signal received quality, RSRQ, --;

Column 22, Line 31, in Claim 9, delete "signal-to-noise-plus-interference ratio, SINR;" and insert -- signal-to-noise-plus-interference ratio, SNIR; --;

Column 24, Line 46, in Claim 26, after "based" insert -- on --.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*